United States Patent
Takagi et al.

(10) Patent No.: US 9,535,202 B2
(45) Date of Patent: Jan. 3, 2017

(54) MULTILAYER RETARDATION FILM AND METHOD FOR PRODUCING SAME

(71) Applicant: ZEON CORPORATION, Tokyo (JP)

(72) Inventors: Kazuki Takagi, Tokyo (JP); Hung Trong La, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 4 days.

(21) Appl. No.: 14/765,388

(22) PCT Filed: Jan. 23, 2014

(86) PCT No.: PCT/JP2014/051343
§ 371 (c)(1),
(2) Date: Aug. 3, 2015

(87) PCT Pub. No.: WO2014/119457
PCT Pub. Date: Aug. 7, 2014

(65) Prior Publication Data
US 2015/0378079 A1     Dec. 31, 2015

(30) Foreign Application Priority Data

Feb. 4, 2013   (JP) ................... 2013-019605

(51) Int. Cl.
*G02B 5/30*     (2006.01)
*G02B 1/04*     (2006.01)
(Continued)

(52) U.S. Cl.
CPC ........... *G02B 5/3083* (2013.01); *B29C 55/023* (2013.01); *B29D 11/00644* (2013.01); *B32B 7/02* (2013.01);
(Continued)

(58) Field of Classification Search
CPC ....... G02B 5/3083; G02B 5/3091; G02B 5/32; G02B 1/04; G02F 1/133634; G02F 2001/133635; G02F 2001/133638; B29C 55/023; B29D 11/00644; B32B 7/02; B32B 27/08; B32B 2307/42; B32B 2457/202; B29K 2069/00; B29K 2995/0034

USPC ................. 359/489.07; 349/117, 119, 120
See application file for complete search history.

(56) References Cited

U.S. PATENT DOCUMENTS 8,214,174 B2     7/2012   Ganapathy et al.
9,050,763 B2 *   6/2015   Hatano .............. B29D 11/0073
(Continued)

FOREIGN PATENT DOCUMENTS

JP     2004-226591 A     8/2004
JP     2004-326089 A     11/2004
(Continued)

OTHER PUBLICATIONS

Mar. 18, 2014 International Search Report issued in International Patent Application No. PCT/JP2014/051343.
(Continued)

*Primary Examiner* — Frank Font
(74) *Attorney, Agent, or Firm* — Oliff PLC

(57) ABSTRACT

A layered phase difference film including, in the following order: a resin layer A1 formed of a resin A1 having a positive intrinsic birefringence; a resin layer B formed of a resin B having a negative intrinsic birefringence; and a resin layer A2 formed of a resin A2 having a positive intrinsic birefringence, wherein the resin layer A1 and the resin layer B are in direct contact with each other, the resin layer B and the resin layer A2 are in direct contact with each other, the resin layer A1 and the resin layer A2 are negative C-plates, the resin layer B is a positive B-plate, and the layered phase difference film has an Nz coefficient within a range of 0 to 1.

11 Claims, 2 Drawing Sheets

(51) Int. Cl.
　　*B29C 55/02* (2006.01)
　　*B29D 11/00* (2006.01)
　　*B32B 7/02* (2006.01)
　　*B32B 27/08* (2006.01)
　　*B29K 69/00* (2006.01)

(52) U.S. Cl.
　　CPC ............... *B32B 27/08* (2013.01); *G02B 1/04* (2013.01); *B29K 2069/00* (2013.01); *B29K 2995/0034* (2013.01); *B32B 2307/42* (2013.01); *B32B 2457/202* (2013.01)

(56) References Cited

U.S. PATENT DOCUMENTS

2005/0062917 A1* 3/2005 Kashima ............. G02B 5/3016
　　　　　　　　　　　　　　　　　　　349/120
2013/0329290 A1　12/2013　Inoue

FOREIGN PATENT DOCUMENTS

| | | |
|---|---|---|
| JP | 2008-192612 A | 8/2008 |
| JP | 2009-192844 A | 8/2009 |
| JP | 2011-039338 A | 2/2011 |
| JP | 5062385 B1 | 10/2012 |

OTHER PUBLICATIONS

Mar. 18, 2014 Written Opinion issued in International Patent Application No. PCT/JP2014/051343.

* cited by examiner

MULTILAYER RETARDATION FILM AND METHOD FOR PRODUCING SAME

FIELD

The present invention relates to a layered phase difference film and a method for producing the same.

BACKGROUND

A liquid crystal display device generally includes a liquid crystal cell and a pair of polarizing plates (i.e., an incident-side polarizing plate and an emission-side polarizing plate) disposed so as to sandwich the liquid crystal cell. In a general liquid crystal display mode such as a VA mode or an IPS mode, the pair of polarizing plates are usually disposed such that their absorption axes are orthogonal to each other. Usually, such a liquid crystal display device displays black color in the absence of an electric field. When black color is displayed, light transmission is blocked.

In some cases, an optical compensation film is provided in the liquid crystal display device to optically compensate such a liquid crystal display device. One example of such an optical compensation film is a layered phase difference film including two or more laminated phase difference films having different retardations (see Patent Literature 1).

However, manufacturing of the layered phase difference film produced by laminating the phase difference films is complicated. Specifically, e.g., the step of adjusting the relationship between the in-plane slow axes of the phase difference films to be laminated and the step of laminating the phase difference films onto each other are necessary, so that the number of steps necessary for the production tends to become large.

Addressing to this issue, there is proposed a method wherein co-stretching is employed for simplifying the production. Examples of this method may include a method including: preparing a layered body including a plurality of layers formed of different materials; and stretching the layered body under appropriate conditions (Patent Literatures 2 and 3).

CITATION LIST

Patent Literature

Patent Literature 1: Japanese Patent Application Laid-Open No. 2008-192612 A
Patent Literature 2: Japanese Patent Application Laid-Open No. 2009-192844 A
Patent Literature 3: Japanese Patent Application Laid-Open No. 2011-39338 A

SUMMARY

Technical Problem

With the method described in Patent Literatures 2 and 3, the pre-stretched layered body may be easily produced using, e.g., a co-flow casting method or a co-extrusion method. When the layered body is stretched, the layers included in the layered body are stretched simultaneously. Therefore, unlike the technique described in Patent Literature 1, it is unnecessary to subject each of the phase difference films to stretching treatment separately, and it is also unnecessary to adjust the relationship between the in-plane slow axes. With the method described in Patent Literatures 2 and 3, a layered phase difference film can thus be easily produced.

In recent years, the level of requirements for liquid crystal display devices is increasing. Therefore, with a liquid crystal display device that uses, as an optical compensation film, a layered phase difference film produced using the method described in Patent Literatures 2 and 3, front brightness and light leakage when black color is displayed may not be sufficiently reduced to meet the increasing demands. In view of the foregoing, the present inventor has conducted further studies and found out the following. With the technique using co-stretching as described in Patent Literatures 2 and 3, the relationship between the in-plane slow axes of the layers included in the layered phase difference film may be shifted from the intended relationship therebetween. Therefore, when the shift in the relationship between the in-plane slow axes can be improved, front brightness and light leakage when black color is displayed can be sufficiently reduced.

When a layered body having a plurality of layers is stretched to co-stretch the layers included in the layered body, these layers are expected to be stretched under the same conditions. Therefore, it has been believed that, with the production method using co-stretching, the appearance of an in-plane slow axis in a direction different from the intended direction due to stretching of, e.g., only part of the layers under conditions different from the conditions for the rest of the layers would never happen. Therefore, it has been believed that the relationship between the in-plane slow axes of the layers in the layered phase difference film obtained would never be shifted from the intended relationship. Therefore, it is surprising that, even with the method for producing a layered phase difference film using co-stretching, the relationship between the in-plane slow axes of the layers is shifted from the intended relationship.

The present invention has been created in view of the foregoing problem, and it is an object thereof to provide a layered phase difference film in which shift in the relationship between the directions of the in-plane slow axes of the layers included in the layered phase difference film can be prevented and with which front brightness and light leakage in a liquid crystal display device when black color is displayed thereon can be reduced. It is also an object of the present invention to provide a method for producing such a layered phase difference film.

Solution to Problem

The present inventor has conducted intensive studies to solve the aforementioned problem and found out that the shift in the relationship between the in-plane slow axes occurs between a resin layer formed of a resin having a positive intrinsic birefringence and a resin layer formed of a resin having a negative intrinsic birefringence. The present inventor has further found out that, when the in-plane retardation of one of the resin layer formed of the resin having a positive intrinsic birefringence and the resin layer formed of the resin having a negative intrinsic birefringence is made small to the extent to be practically negligible, the relationship between the in-plane slow axes is easily prevented from being shifted from the intended relationship. The present inventor has completed the present invention on the basis of the aforementioned findings.

Accordingly, the present invention is as follows.

(1) A layered phase difference film comprising, in the following order: a resin layer A1 formed of a resin A1 having a positive intrinsic birefringence; a resin layer B formed of a resin B having a negative intrinsic birefringence; and a resin layer A2 formed of a resin A2 having a positive intrinsic birefringence, wherein the resin layer A1 and the resin layer B are in direct contact with each other, the resin layer B and the resin layer A2 are in direct contact with each other, the resin layer A1 and the resin layer A2 are negative C-plates, the resin layer B is a positive B-plate, and the layered phase difference film has an Nz coefficient within a range of 0 to 1.

(2) The layered phase difference film according to (1), wherein an in-plane retardation $Re_{A1}$ of the resin layer A1, a retardation $Rth_{A1}$ of the resin layer A1 in a thickness direction, an in-plane retardation $Re_B$ of the resin layer B, a retardation $Rth_B$ of the resin layer B in the thickness direction, an in-plane retardation $Re_{A2}$ of the resin layer A2, and a retardation $Rth_{A2}$ of the resin layer A2 in the thickness direction satisfy 0 nm≤$Re_{A1}$≤5 nm,
100 nm≤$Rth_{A1}$≤160 nm,
110 nm≤$Re_B$≤150 nm,
−160 nm≤$Rth_B$≤−100 nm,
0 nm≤$Re_{A2}$≤5 nm, and
10 nm≤$Rth_{A2}$≤40 nm, the in-plane retardation $Re_{A1}$, the retardation $Rth_{A1}$, the in-plane retardation $Re_B$, the retardation $Rth_B$, the in-plane retardation $Re_{A2}$, and the retardation $Rth_{A2}$ being measured at a wavelength of 550 nm.

(3) The layered phase difference film according to (1) or (2), wherein an absolute difference between a glass transition temperature $Tg_{A1}$ of the resin A1 and a glass transition temperature $Tg_B$ of the resin B is higher than 5° C. and 40° C. or lower.

(4) The layered phase difference film according to any one of (1) to (3), having an in-plane retardation Re of 50 nm or more and 400 nm or less.

(5) The layered phase difference film according to any one of (1) to (4), having a retardation Rth in the thickness direction of −50 nm or more and 50 nm or less.

(6) A method for producing a layered phase difference film according to any one of (1) to (5), the method comprising:

a first stretching step of stretching a resin layered body including, in the following order, a layer a1 formed of the resin A1, a layer b formed of the resin B and in direct contact with the layer a1, and a layer a2 formed of the resin A2 and in direct contact with the layer b at a temperature T1 and a stretching ratio of 1.1 times or more and 2 times or less in a first direction; and a second stretching step of stretching the resin layered body that has been stretched in the first stretching step at a temperature T2 that is lower than the temperature T1 in a second direction that is orthogonal to the first direction to thereby obtain the layered phase difference film.

(7) The method for producing a layered phase difference film according to (6), wherein the resin layer B of the layered phase difference film has an in-plane slow axis parallel to the first direction.

(8) The method for producing a layered phase difference film according to (6) or (7), wherein (a total thickness of the layer a1+a total thickness of the layer a2)/(a total thickness of the layer b) is 1/15 or more and 1/4 or less.

(9) The method for producing a layered phase difference film according to any one of (6) to (8), wherein the resin layered body is produced by a co-extrusion method using the resin A1, the resin B, and the resin A2.

(10) The method for producing a layered phase difference film according to any one of (6) to (9), wherein the glass transition temperature $Tg_{A1}$ of the resin A1 and the glass transition temperature $Tg_{A2}$ of the resin A2 are higher than the glass transition temperature $Tg_B$ of the resin B, and the temperature T1 is higher than $Tg_B$ and is lower than a higher one of $Tg_{A1}$ and $Tg_{A2}$+20° C.

(11) The method for producing a layered phase difference film according to any one of (6) to (10), wherein the glass transition temperature $Tg_{A1}$ of the resin A1 and the glass transition temperature $Tg_{A2}$ of the resin A2 are higher than the glass transition temperature $Tg_B$ of the resin B, and the temperature T2 is higher than $Tg_B$−20° C. and lower than $Tg_B$+5° C.

Advantageous Effects of Invention

With the layered phase difference film of the present invention, the shift in the relationship between the directions of the in-plane slow axes of the layers included in the layered phase difference film can be prevented, and front brightness and light leakage in a liquid crystal display device when black color is displayed thereon can be reduced sufficiently.

The method for producing the layered phase difference film of the present invention can produce a layered phase difference film in which the shift in the relationship between the directions of the in-plane slow axes of the layers included in the layered phase difference film can be prevented and with which front brightness and light leakage in a liquid crystal display device when black color is displayed thereon can be sufficiently reduced.

DESCRIPTION OF EMBODIMENTS

Figure 1:
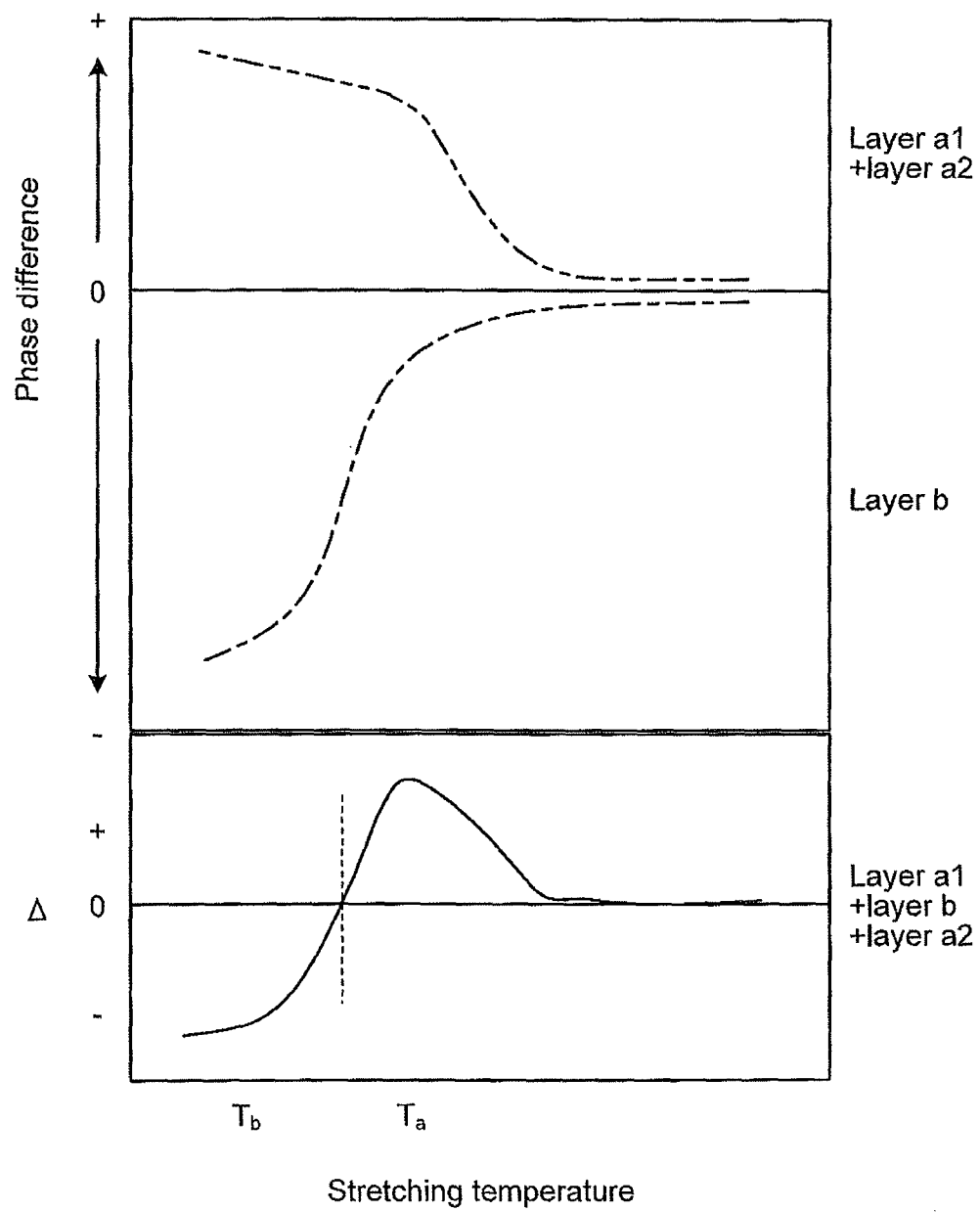
FIG.1 is a graph showing an example of the temperature dependence of retardation with reference to the direction of stretching when each of a layer a1, a layer a2, and a layer b in a resin layered body is stretched and also showing an example of the temperature dependence of retardation Δ with reference direction of stretching when the resin layered body is stretched, with a proviso that a resin A1 and a resin A2 are the same resin, the glass transition temperature $Tg_{A1}$ the resin A1 (or resin A2) constituting the layer a1 and the layer a2 is high, and the glass transition temperature $Tg_B$ of the resin B constituting the layer b is low.

The present invention will be described hereinbelow in detail by way of exemplifications and embodiments. However, the present invention is not limited to the following exemplifications and embodiments and may be implemented with any modifications without departing from the scope of the claims and equivalents thereto.

In the following description, a positive intrinsic birefringence means that the refractive index in a stretched direction is larger than the refractive index in a direction orthogonal to the stretched direction. A negative intrinsic birefringence means that the refractive index in the stretched direction is smaller than the refractive index in the direction orthogonal to the stretched direction. The intrinsic birefringence value may be calculated from a permittivity distribution.

Unless otherwise specified, the in-plane retardation of a film or layer is a value represented by $(nx-ny) \times d$. Unless otherwise specified, the retardation of the film or layer in its thickness direction is a value represented by $\{(nx+ny)/2-nz\} \times d$. Unless otherwise specified, the Nz coefficient of the film or layer is a value represented by $(nx-nz)/(nx-ny)$. Herein nx represents a refractive index in a direction that is perpendicular to the thickness direction (an in-plane direction) of the film or layer and gives the maximum refractive index. ny represents a refractive index in an in-plane direction of the film or layer that is perpendicular to the direction of nx. nz represents a refractive index in the thickness direction of the film or layer. d represents the thickness of the film or layer. Unless otherwise specified, the retardations are measured at a wavelength of 550 nm. The retardations may be measured using a commercially available retardation measurement apparatus (for example, "KOBRA-21ADH" manufactured by Oji Scientific Instruments or "WPA-micro" manufactured by Photonic Lattice, Inc.) or a Senarmont method.

Unless otherwise specified, the slow axis of the film or layer is an in-plane slow axis.

A "polarizing plate", a "quarter-wave plate", a "B-plate", and a "C-plate" include not only rigid members but also flexible members such as resin-made films.

Unless otherwise specified, when directions of components are "parallel", "perpendicular", or "orthogonal" to each other, these directions may contain errors within the range in which the effects of the present invention are not impaired, e.g., within the range of usually ±5°, preferably ±2°, and more preferably ±1°.

A "long-length" member is a member having a length longer than its width by a factor of at least 5 and preferably by a factor of 10 or more and specifically is a member having a length that allows it to be wound into a roll for storage or conveyance.

The MD direction (machine direction) of a long-length film is a direction of the flow of the film in a production line and is usually parallel to the length direction and lengthwise direction of the long-length film. The TD direction (traverse direction) of the long-length film is a direction parallel to the film surface and perpendicular to the MD direction and is usually parallel to the width direction and crosswise direction of the long-length film.

[1. Summary of Layered Phase Difference Film]

The layered phase difference film of the present invention includes a resin layer A1, a resin layer B, and a resin layer A2 in this order. The resin layer A1 and the resin layer B are in direct contact with each other, and the resin layer B and the resin layer A2 are in direct contact with each other. That is, no other layer is present between the resin layer A1 and the resin layer B, and no other layer is present between the resin layer B and the resin layer A2.

[2. Resin Layer A1]

The resin layer A1 is a layer formed of a resin A1. As the resin A1, any resin having a positive intrinsic birefringence may be used. Particularly, it is preferable to use a thermoplastic resin as the resin A1.

Sine the intrinsic birefringence of the resin A1 is positive, the resin A1 usually contains a polymer having a positive intrinsic birefringence. Examples of such a polymer may include: olefin polymers such as polyethylene and polypropylene; polyester polymers such as polyethylene terephthalate and polybutylene terephthalate; polyarylene sulfide polymers such as polyphenylene sulfide; polyvinyl alcohol polymers; polycarbonate polymers; polyarylate polymers; cellulose ester polymers; polyether sulfone polymers; polysulfone polymers; polyarylsulfone polymers; polyvinyl chloride polymers; norbornene polymers; and rod-like liquid crystal polymers. Among these polymers, one type thereof may be solely used, and two or more types thereof may also be used in combination at any ratio. The polymer may be a homopolymer, and may also be a copolymer. Of these, polycarbonate polymers are preferable from the viewpoint of retardation expression, stretchability at low temperature, and the adhesion between the resin layer A1 and a layer other than the resin layer A1.

The polycarbonate polymer for use may be any polymer having a structural unit including a carbonate bond (—O—C(=O)—O—). Examples of the polycarbonate polymer may include bisphenol A polycarbonate, branched bisphenol A polycarbonate, and o,o,o',o'-tetramethyl bisphenol A polycarbonate.

The resin A1 may contain an additive. Examples of the additive may include: lubricants; lamellar crystal compounds; fine inorganic particles; stabilizers such as antioxidants, thermal stabilizers, light stabilizers, weathering stabilizers, ultraviolet absorbers, and near-infrared absorbers; plasticizers; colorants such as dyes and pigments; and antistatic agents. Of these, lubricants and ultraviolet absorbers are preferable because they can improve flexibility and weather resistance. Among these additives, one type thereof may be solely used, and two or more types thereof may also be used in combination at any ratio.

Examples of the lubricants may include: inorganic particles of, e.g., silicon dioxide, titanium dioxide, magnesium oxide, calcium carbonate, magnesium carbonate, barium sulfate, and strontium sulfate; and organic particles of, e.g., polymethyl acrylate, polymethyl methacrylate, polyacrylonitrile, polystyrene, cellulose acetate, and cellulose acetate propionate. Of these, organic particles are preferable as the lubricant.

Examples of the ultraviolet absorber may include oxybenzophenone-based compounds, benzotriazole-based compounds, salicylate-based compounds, benzophenone-based ultraviolet absorbers, benzotriazole-based ultraviolet absorbers, acrylonitrile-based ultraviolet absorbers, triazine-based compounds, nickel complex salt-based compounds, and inorganic powders. Preferable examples of the ultraviolet absorber may include 2,2'-methylenebis(4-(1,1,3,3-tetramethylbutyl)-6-(2H-benzotriazol-2-yl)phenol), 2-(2'-hydroxy-3'-tert-butyl-5'-methylphenyl)-5-chlorobenzotriazole, 2,4-di-tert-butyl-6-(5-chlorobenzotriazol-2-yl)phenol, 2,2'-dihydroxy-4,4'-dimethoxybenzophenone, and 2,2',4,4'-tetrahydroxybenzophenone. Particularly preferable examples may include 2,2'-methylenebis(4-(1,1,3,3-tetramethylbutyl)-6-(2H-benzotriazol-2-yl)phenol).

The amount of the additives may be appropriately set within the range in which the effects of the present invention are not significantly impaired. The amount of the additives may be, e.g., within the range in which the layered phase difference film can maintain a total light transmittance of 80% or more per a thickness of 1 mm.

It is preferable that the weight average molecular weight of the resin A1 is controlled within the range in which a method such as a melt extrusion method or a solution casting method can be performed using the resin A1.

The glass transition temperature $Tg_{A1}$ of the resin A1 is preferably 80° C. or higher, more preferably 90° C. or higher, still more preferably 100° C. or higher, yet more preferably 110° C. or higher, and particularly preferably 120° C. or higher. Since the glass transition temperature $Tg_{A1}$ is as high as described above, the orientational relaxation of the resin A1 can be reduced. No particular limitation is imposed on the upper limit of the glass transition temperature $Tg_{A1}$, but the glass transition temperature $Tg_{A1}$ is usually 200° C. or lower.

The rupture elongation of the resin A1 at the glass transition temperature $Tg_B$ of a resin B is preferably 50% or more, and more preferably 80% or more. When the rupture elongation is within the aforementioned range, the layered phase difference film can be stably produced by stretching. The rupture elongation may be determined using a type 1B test piece described in JIS K7127 at a tensile rate of 100 mm/min. No particular limitation is imposed on the upper limit of the rupture elongation of the resin A1, but the rupture elongation is usually 200% or less.

The resin layer A1 is a negative C-plate. The negative C-plate herein means a layer having refractive indices nx, ny, and nz satisfying nx>nz and ny>nz and having an in-plane retardation Re satisfying 0 nm≤Re≤5 nm. With such a negative C-plate, the value of the retardation in its thickness direction is positive.

The specific value of the in-plane retardation $Re_{A1}$ measured at a wavelength of 550 nm, of the resin layer A1 is usually 0 nm or more, and is usually 5 nm or less, preferably 3 nm or less, and more preferably 1 nm or less. When the in-plane retardation $Re_{A1}$ of the resin layer A1 is set within the aforementioned range, optical compensation of the liquid crystal display device can be appropriately performed.

It is preferable that the specific value of the retardation $Rth_{A1}$, measured at a wavelength of 550 nm, of the resin layer A1 in the thickness direction satisfies 100 nm≤$Rth_{A1}$≤160 nm. More particularly, the retardation $Rth_{A1}$ of the resin layer A1 in the thickness direction is preferably 100 nm or more, more preferably 110 nm or more, and particularly preferably 120 nm or more, and is preferably 160 nm or less, more preferably 150 nm or less, and particularly preferably 140 nm or less. When the retardation $Rth_{A1}$ of the resin layer A1 in the thickness direction is set within the aforementioned range, optical compensation of the liquid crystal display device can be appropriately performed.

Examples of the method for controlling the in-plane retardation $Re_{A1}$ of the resin layer A1 and its retardation $Rth_{A1}$ in the thickness direction to be within the aforementioned ranges may include a method in which stretching ratios and stretching temperatures upon stretching a resin layered body for producing the layered phase difference film are controlled.

The thickness of the resin layer A1 is preferably 2 μm or more, more preferably 4 μm or more, and particularly preferably 5 μm or more, and is preferably 12 μm or less, more preferably 10 μm or less, and particularly preferably 8 μm or less. When the thickness of the resin layer A1 is equal to or more than the lower limit of the aforementioned range, variations in thickness can be reduced. When the thickness of the resin layer A1 is equal to or less than the upper limit, thickness of the liquid crystal display device can be reduced.

It is preferable that the variations in the thickness of the resin layer A1 are 1 μm or less over the entire surface. Consequently, unevenness in the color tone of the display device can be reduced. In addition, changes in the color tone after long-term use can be made uniform. In order to achieve this, e.g., it is preferable that variations in the thickness of a layer a1 in the resin layered body is confined to 1 μm or less over the entire surface.

[3. Resin Layer B]

The resin layer B is a layer formed of a resin B. As the resin B, any resin having a negative intrinsic birefringence may be used. Particularly, it is preferable to use a thermoplastic resin as the resin B.

Since the intrinsic birefringence of the resin B is negative, the resin B usually contains a polymer having a negative intrinsic birefringence. Examples of such a polymer may include: polystyrene-based polymers including homopolymers of styrene and styrene derivatives and copolymers of styrene and styrene derivatives with other optional monomers; polyacrylonitrile polymers; polymethyl methacrylate polymers; and multi-component copolymers thereof. Preferable examples of optional monomers copolymerizable with styrene and styrene derivatives may include acrylonitrile, maleic anhydride, methyl methacrylate, and butadiene. Among these polymers, one type thereof may be solely used, and two or more types thereof may also be used in combination at any ratio. Of these, polystyrene-based polymers are preferable from the viewpoint of high retardation expression, and copolymers of styrene or styrene derivatives with maleic anhydride are particularly preferable from the viewpoint of high heat resistance. In this case, the amount of the maleic anhydride unit with respect to 100 parts by weight of the polystyrene-based polymer is preferably 5 parts by weight or more, more preferably 10 parts by weight or more, and particularly preferably 15 parts by weight or more, and is preferably 30 parts by weight or less, more preferably 28 parts by weight or less, and particularly preferably 26 parts by weight or less. The maleic anhydride unit is a structural unit having a structure formed by polymerization of maleic anhydride.

The resin B may contain an additive. Examples of the additive may include the same additives as those that may be contained in the resin A1. As the additive, one type thereof may be solely used, and two or more types thereof may also be used in combination at any ratio.

The amount of the additives may be appropriately set within the range in which the effects of the present invention are not significantly impaired. The amount of the additives may be, e.g., within the range in which the layered phase difference film can maintain a total light transmittance of 80% or more per a thickness of 1 mm.

It is preferable that the weight average molecular weight of the resin B is controlled within the range in which a method such as a melt extrusion method or a solution casting method can be performed using the resin B.

The glass transition temperature $Tg_B$ of the resin B is preferably 80° C. or higher, more preferably 90° C. or higher, still more preferably 100° C. or higher, yet more preferably 110° C. or higher, and particularly preferably 120° C. or higher. Since the glass transition temperature $Tg_B$ is as high as described above, the orientational relaxation of the resin B can be reduced. No particular limitation is imposed on the upper limit of the glass transition temperature $Tg_B$, but the glass transition temperature $Tg_B$ is usually 200° C. or lower.

The rupture elongation of the resin B at the glass transition temperature $Tg_{A1}$ of the resin A1 is preferably 50% or more and more preferably 80% or more. When the rupture elongation is within the aforementioned range, a layered phase difference film can be stably produced by stretching.

No particular limitation is imposed on the upper limit of the rupture elongation of the resin B, but the rupture elongation is usually 200% or less.

The absolute value of the difference between the glass transition temperature $Tg_{A1}$ of the resin A1 and the glass transition temperature $Tg_B$ of the resin B is preferably higher than 5° C. and more preferably 8° C. or higher, and is preferably 40° C. or lower and more preferably 20° C. or lower. When the absolute value of the difference between the glass transition temperatures is larger than the lower limit of the aforementioned range, the temperature dependence of retardation expression can be increased. When the absolute value is equal to or less than the upper limit, a resin having a higher glass transition temperature can be easily stretched, and the flatness of the layered phase difference film can be increased.

It is preferable that the glass transition temperature $Tg_B$ of the resin B is lower than the glass transition temperature $Tg_{A1}$ of the resin A1. Therefore, it is preferable that the resin A1 and the resin B satisfy the relationship $Tg_{A1} > Tg_B + 5°$ C.

The resin layer B is a positive B-plate. The positive B-plate herein means a layer having refractive indices nx, ny, and nz satisfying nz>nx>ny. With such a positive B-plate, the value of the retardation in the thickness direction is negative.

It is preferable that the specific value of the in-plane retardation $Re_B$ of the resin layer B measured at a wavelength of 550 nm satisfies 110 nm≤$Re_B$≤150 nm. More particularly, the in-plane retardation $Re_B$ of the resin layer B is preferably 110 nm or more, more preferably 115 nm or more, and particularly preferably 120 nm or more, and is preferably 150 nm or less, more preferably 145 nm or less, and particularly preferably 140 nm or less. When the in-plane retardation $Re_B$ of the resin layer B is within the aforementioned range, optical compensation of the liquid crystal display device can be appropriately performed.

It is preferable that the specific value of the retardation $Rth_B$ of the resin layer B in the thickness direction that is measured at a wavelength of 550 nm satisfies −160 nm $Rth_B$≤−100 nm. More particularly, the retardation $Rth_B$ of the resin layer B in the thickness direction is preferably −160 nm or more, more preferably −150 nm or more, and particularly preferably −140 nm or more, and is preferably −100 nm or less, more preferably −110 nm or less, and particularly preferably −120 nm or less. When the retardation $Rth_B$ of the resin layer B in the thickness direction is within the aforementioned range, optical compensation of the liquid crystal display device can be appropriately performed.

Examples of the method for controlling the in-plane retardation $Re_B$ of the resin layer B and its retardation $Rth_B$ in the thickness direction to be within the aforementioned ranges may include a method in which stretching ratios and stretching temperatures upon stretching a resin layered body for producing the layered phase difference film are controlled.

The thickness of the resin layer B is preferably 40 μm or more, more preferably 45 μm or more, and particularly preferably 50 μm or more, and is preferably 70 μm or less, more preferably 65 μm or less, and particularly preferably 60 μm or less. When the thickness of the resin layer B is equal to or more than the lower limit of the aforementioned range, desired retardation expression can be easily obtained. When the thickness is equal to or less than the upper limit, thickness of the liquid crystal display device can be reduced.

It is preferable that variations in the thickness of the resin layer B are 1 μm or less over the entire surface. Consequently, unevenness in the color tone of the display device can be reduced. In addition, changes in the color tone after long-term use can be made uniform. In order to achieve this, e.g., it is preferable that variations in the thickness of a layer b in the resin layered body is confined to 1 μm or less over the entire surface.

[4. Resin Layer A2]

The resin layer A2 is a layer formed of a resin A2. As the resin A2, any resin having a positive intrinsic birefringence may be used. Particularly, it is preferable to use a thermoplastic resin as the resin A2. Particularly, it is preferable to selected a material as the resin A2 from the range of materials that are the same as those for the resin A1 described above. Therefore, e.g., the type and amount of polymers and additives that the resin A2 may contain and the weight average molecular weight and glass transition temperature of the resin A2 may be the same as those of the resin A1.

As the resin A2 for use, a resin that is different from the resin A1 may be selected from the range of materials that are the same as those for the resin A1. Therefore, e.g., the resin A2 may contain a polymer that is different in type from the polymer contained in the resin A1. Further, e.g., the resin A2 may contain the same type of polymer as that contained in the resin A1 and may further contain an additive that is different in type from that contained in the resin A1. Further, e.g., the resin A2 may contain the same type of polymer and the same type of additive as those contained in the resin A1, and the amounts of the polymer and additive may be different from those in the resin A1. However, it is particularly preferable that the same resin as the resin A1 is used as the resin A2. When the resin A1 and the resin A2 are the same resin, deflection and warpage of the layered phase difference film can be prevented.

The resin layer A2 is a negative C-plate. Therefore, the resin layer A2 has refractive indices nx, ny, and nz satisfying nx>nz and ny>nz, and has an in-plane retardation Re satisfying 0 nm Re nm.

The specific value of the in-plane retardation $Re_{A2}$ of the resin layer A2 measured at a wavelength of 550 nm is usually 0 nm or more, and is usually 5 nm or less, preferably 3 nm or less, and more preferably 1 nm or less. When the in-plane retardation $Re_{A2}$ of the resin layer A2 is set within the aforementioned range, optical compensation of the liquid crystal display device can be appropriately performed.

It is preferable that the specific value of the retardation $Rth_{A2}$ of the resin layer A2 in the thickness direction that is measured at a wavelength of 550 nm satisfies 10 nm≤$Rth_{A2}$≤40 nm. More particularly, the retardation $Rth_{A2}$ of the resin layer A2 in the thickness direction is preferably 10 nm or more, more preferably 15 nm or more, and particularly preferably 20 nm or more, and is preferably 40 nm or less, more preferably 35 nm or less, and particularly preferably 30 nm or less. When the retardation $Rth_{A2}$ of the resin layer A2 in the thickness direction is set within the aforementioned range, optical compensation of the liquid crystal display device can be appropriately performed.

Examples of the method for controlling the in-plane retardation $Re_{A2}$ of the resin layer A2 and its retardation $Rth_{A2}$ in the thickness direction to be within the aforementioned ranges may include a method in which stretching ratios and stretching temperatures upon stretching a resin layered body for producing the layered phase difference film are controlled.

The thickness of the resin layer A2 is preferably 0.4 μm or more, more preferably 0.6 μm or more, and particularly preferably 0.8 μm or more, and is preferably 2.0 μm or less, more preferably 1.8 μm or less, and particularly preferably 1.6 μm or less. When the thickness of the resin layer A2 is equal to or more than the lower limit of the aforementioned range, variations in thickness can be reduced. When the thickness is equal to or less than the upper limit, thickness of the liquid crystal display device can be reduced.

It is preferable that the variations in the thickness of the resin layer A2 are 1 μm or less over the entire surface. Consequently, unevenness in the color tone of the display device can be reduced. In addition, changes in the color tone after long-term use can be made uniform. In order to achieve this, e.g., it is preferable that variations in the thickness of a layer a2 in the resin layered body is confined to 1 μm or less over the entire surface.

[5. Optional Layer]

The layered phase difference film of the present invention may further include an optional layer in addition to the aforementioned resin layer A1, resin layer B, and resin layer A2, so long as the effects of the present invention are not significantly impaired. The optional layer is disposed such that the direct contact between the resin layer A1 and the resin layer B and the direct contact between the resin layer B and the resin layer A2 are not disturbed.

Examples of the optional layer may include a mat layer capable of improving the sliding property of the film, a hard coat layer such as a shock resistant polymethacrylate resin layer, an anti-reflection layer, and an anti-fouling layer.

[6. Physical Properties of Layered Phase Difference Film]

As having been explained, in the layered phase difference film of the present invention, the resin layer A1 and the resin layer A2 are negative C-plates. Therefore, each of the resin layers A1 and A2 has no in-plane slow axis, or even if it has, its in-plane retardation is small to a negligible degree. Consequently, the front brightness when black color is displayed on the liquid crystal display device can be sufficiently reduced without setting the directions of the in-plane slow axes of the resin layers A1 and A2 in accordance with the direction of the in-plane slow axis of the resin layer B. Further, since thereby the layered phase difference film can usually have improved compensation performance, light leakage in the liquid crystal display device can be reduced.

Generally, the direction of an in-plane slow axis expression when a resin having a positive intrinsic birefringence is stretched is different from the direction of an in-plane slow axis expression when a resin having a negative intrinsic birefringence is stretched. Therefore, in a prior art layered phase difference film including a combination of a layer of a resin having a positive intrinsic birefringence and a layer of a resin having a negative intrinsic birefringence, it is difficult to appropriately control the relationship between the directions of the in-plane slow axes of the layers caused by stretching. Particularly, in the prior art layered phase difference film, it is difficult to orient the in-plane slow axes of the layers in desired directions at edge portions in width direction of the film, and in turn it is particularly difficult to control the directions of the in-plane slow axes of the layers as intended. For example, in a prior art phase difference film including a layer of a resin having a positive intrinsic birefringence, a layer of a resin having a negative intrinsic birefringence, and a layer of a resin having a positive intrinsic birefringence in this order, even when an attempt is made to orient the directions of the in-plane slow axes of all the layers parallel to each other, the in-plane slow axes of the layers of the resins having a positive intrinsic birefringence often become non-parallel to the in-plane slow axis of the layer of the resin having a negative intrinsic birefringence.

However, in the layered phase difference film of the present invention, the resin layers A1 and A2 have substantially no in-plane slow axes. Therefore, in the layered phase difference film including the combination of the layers of the resins having a positive intrinsic birefringence and the layer of the resin having a negative intrinsic birefringence, it is unnecessary to set the direction of the in-plane slow axis of the resin layer B in accordance with the directions of the in-plane slow axes of the resin layers A1 and A2. Therefore, in the layered phase difference film of the present invention, the shift in the relationship between the in-plane slow axes of the layers included in the layered phase difference film can be prevented.

The layered phase difference film has an Nz coefficient of usually 0 or more, preferably 0.3 or more, and more preferably 0.5 or more, and is usually 1 or less, preferably 0.9 or less, and more preferably 0.8 or less. When the layered phase difference film has an Nz coefficient within the aforementioned range, optical compensation of the liquid crystal display device can be appropriately performed.

The in-plane retardation Re of the layered phase difference film is preferably 50 nm or more and more preferably 100 nm or more, and is preferably 400 nm or less and more preferably 350 nm or less. When the layered phase difference film has an in-plane retardation Re within the aforementioned range, optical compensation of the liquid crystal display device can be appropriately performed.

The retardation Rth of the layered phase difference film in the thickness direction is preferably −50 nm or more, more preferably −40 nm or more, and particularly preferably −30 nm or more, and is preferably 50 nm or less, more preferably 40 nm or less, and particularly preferably 30 nm or less. When the layered phase difference film has a retardation Rth in the thickness direction within the aforementioned range, optical compensation of the liquid crystal display device can be appropriately performed.

It is preferable that the layered phase difference film in its entirety has refractive indices nx, ny, and nz satisfying the relationship nx>nz>ny. Consequently, optical compensation of the liquid crystal display device can be appropriately performed. The refractive indices nx, ny, and nz of the layered phase difference film are calculated using the in-plane retardation Re of the layered phase difference film, its retardation Rth in the thickness direction, the thickness of the layered phase difference film, and the average refractive index nave of the layered phase difference film. The average refractive index nave can be determined using the following formula.

$$nave = \Sigma(ni \times Li)/\Sigma Li$$

ni: Refractive index of resin in i-th layer

Li: Thickness of i-th layer

The total light transmittance of the layered phase difference film is preferably 85% or more and 100% or less. The light transmittance may be measured in accordance with JIS K0115 using a spectrophotometer (ultraviolet-visible-near-infrared spectrophotometer "V-570", manufactured by JACSO Corporation).

The haze of the layered phase difference film is preferably 5% or less, more preferably 3% or less, and particularly preferably 1% or less, and is ideally 0%. When the haze value is small, sharpness of the image displayed on a display device including the layered phase difference film of the present invention can be increased. The haze may be measured in accordance with JIS K7361-1997 at five points using a "turbidimeter NDH-300A" manufactured by Nippon Denshoku Industries Co., Ltd., and an average value of measurements may be adopted.

The layered phase difference film has a ΔYI of preferably 5 or less and more preferably 3 or less. When the ΔYI is within the aforementioned range, good visibility without coloring can be obtained. The lower limit of the ΔYI is ideally zero. The ΔYI may be measured in accordance with ASTM E313 using a "spectral color-difference meter SE2000" manufactured by Nippon Denshoku Industries Co., Ltd. The measurement is repeated five times, and the ΔYI is determined as the arithmetic average of the measured values.

It is preferable that the layered phase difference film has a JIS pencil hardness of H or more. The JIS pencil hardness may be controlled by changing the types of the resins and changing thicknesses of the resin layers. The JIS pencil hardness is determined by scratching the surface of a film with pencils in accordance with JIS K5600-5-4. Scratching is performed with pencils with a variety of hardness which are inclined at the angle of 45' to which 500 gram force of downward load is applied. The hardness is determined as the pencil that begins to create scratches.

It is preferable that the outer surface of the layered phase difference film is flat with substantially no irregularly formed linear concave portions and linear convex portions extending in the MD direction. These linear concave portions and linear convex portions are so-called die lines.

The phrase "flat with substantially no irregularly formed linear concave portions and linear convex portions extending in the MD direction" herein means that, even when linear concave portions and linear convex portions are formed, the following condition (X) is met, and preferably the following condition (Y) is met.

Condition (X): the linear concave portions have a depth of less than 50 nm or a width of more than 500 μm, or the linear convex portions have a height of less than 50 nm or a width of more than 500 μm.

Condition (Y): the linear concave portions have a depth of less than 30 nm or a width of more than 700 μm, or the linear convex portions have a height of less than 30 nm or a width of more than 700 μm.

With such a configuration, occurrence of interference of light and light leakage due to, e.g., refraction of the light at the linear concave portions or the linear convex portions can be prevented, so that optical performance can be improved. The phrase "irregularly formed" means that linear concave or convex portions with unintended sizes, unintended shapes, etc. are formed at unintended positions.

The depth of the linear concave portions, the height of the linear convex portions, and the widths of these portions may be determined by the following method. The layered phase difference film is irradiated with light, and the transmitted light is projected onto a screen. Then a portion corresponding to bright and dark stripes on the screen (in this portion, the depth of linear concave portions and the height of linear convex portions are large) is cut out with a size of a 30 mm square. The surface of the cut-out film piece is observed under a three-dimensional surface structure analysis microscope (viewing area: 5 mm×7 mm). The observed image is converted into a three-dimensional image, and a cross-sectional profile of the three-dimensional image is determined. The cross-sectional profiles are determined at intervals of 1 mm in the viewing area.

An average line is drawn in the cross sectional profile. The length from the average line to the bottom of a linear concave portion is the depth of the linear concave portion, and the length from the average line to the apex of a linear convex portion is the height of the linear convex portion. The distance between intersections of the average line and a profile is used as its width. The maximum value of the measured depths of the linear concave portions and the maximum value of the measured heights of the linear convex portions are determined, and the width of the linear concave portion giving the maximum value and the width of the linear convex portion giving the maximum value are determined. The maximum value of the depths of the linear concave portions thus determined is taken as the depth of the linear concave portions in the film, and the width of the linear concave portion giving the maximum value is taken as the width of the linear, concave portions in the film. The maximum value of the heights of the linear convex portions is taken as the height of the linear convex portions in the film, and the width of the linear convex portion giving the maximum value is taken as the width of the linear convex portions in the film.

The layered phase difference film may be a film that shrinks in lengthwise and crosswise directions by heat treatment at 60° C. and 90% RH for 100 hours. However, the shrinkage ratio is preferably 0.5% or less, more preferably 0.3% or less, and ideally 0%. By having such a small shrinkage ratio, it is possible to prevent a phenomenon in which, when the layered phase difference film is used in a high-temperature high-humidity environment, shrinkage stress causes the layered phase difference film to deform and be separated from the display device.

In the layered phase difference film, the total thickness of the aforementioned resin layer A1, resin layer B, and resin layer A2 is preferably 10 μm or more and more preferably 30 μm or more, and is preferably 200 μm or less and more preferably 150 μm or less.

The width size of the layered phase difference film is preferably 500 mm or more and more preferably 1,000 mm or more, and is preferably 2,000 mm or less.

As having been explained, in the layered phase difference film, the resin layer A1 is in direct contact with the resin layer B, and the resin layer B is in direct contact with the resin layer A2'. Therefore, the layered phase difference film of the present invention can have a reduced thickness, and this is advantageous in terms of expression of optical functions. Such a layered phase difference film may be easily produced by, e.g., stretching a resin composition including a layer a1 formed of the resin A1, a layer b formed of the resin B and in direct contact with the layer a1, and a layer a2 formed of the resin A2 and in direct contact with the layer b to thereby co-stretch the layer a1, the layer b, and the layer a2, as described later.

[7. Summary of Method for Producing Layered Phase Difference Film]

No limitation is imposed on the method for producing the layered phase difference film of the present invention. For example, the layered phase difference film may be produced by stretching a resin layered body including a layer a1 formed of the resin A1, a layer b formed of the resin B and in direct contact with the layer a1, and a layer a2 formed of the resin A2 and in direct contact with the layer b in this order. It is preferable that, in this case, the stretching of the resin layered body includes: a first stretching step of stretching the resin layered body in a first direction at a temperature T1; and a second stretching step of stretching the resin layered body that has been stretched in the first stretching step in a second direction that is orthogonal to the first direction at a temperature T2 that is lower than the temperature T1 to obtain a layered phase difference film. This production method will be described in the following.

[8. Resin Layered Body]

As having been explained, the resin layered body includes the layer a1 formed of the resin A1, the layer b formed of the resin B, and the layer a2 formed of the resin A2 in this order. The layer a1 is in direct contact with the layer b, and the layer b is in direct contact with the layer a2. Specifically, no other layer is present between the layer a1 and the layer b, and no other layer is present between the layer b and the layer a2.

The resin layered body has a property that a retardation can be expressed in each of the layer a1, the layer b, and the layer a2 as a result of the stretching of the resin layered body in mutually orthogonal directions at different temperatures T1 and T2 depending on temperatures T1 and T2, the stretching ratios, and the stretching directions. Utilizing this property, the layered phase difference film of the present invention can be produced. Specifically, in the layered phase difference film obtained by stretching this resin layered body, the retardation expressed in the layer a1, the retardation expressed in the layer b, and the retardation expressed in the layer a2 are combined, and the desired in-plane retardation and the desired retardation in the thickness direction are obtained in the layered phase difference film in its entirety.

The degrees of retardations expressed in the layer a1, the layer b, and the layer a2 by stretching are determined by conditions such as the configuration of the resin layered body (for example, the number of layers and the thicknesses of these layers), the stretching temperature, and the stretching ratio. Therefore, it is preferable to set the configuration of the resin layered body in accordance with the optical functions to be expressed, such as the optical compensation function.

Especially, it is preferable that the resin layered body satisfies the requirement that the phase of linearly polarized light that is incident perpendicularly on the film surface and has a vibration plane of its electric vector in an XZ plane with respect to the phase of linearly polarized light that is incident perpendicularly on the film surface and has a vibration plane of its electric vector in a YZ plane is:

delayed when the resin layered body is uniaxially stretched in the X-axis direction at one of the temperatures T1 and T2, and advanced when the resin layered body is uniaxially stretched in the X-axis direction at the other one of the temperatures T1 and T2;

wherein, X axis is a stretching direction in a certain one direction (what is meant by the stretching direction in a certain one direction is a uniaxial stretching direction), Y axis is a direction orthogonal to the uniaxial stretching direction in the film plane, and Z axis is a film thickness direction.

The linearly polarized light that is incident perpendicularly on the film surface and has a vibration plane of its electric vector in the XZ plane is appropriately referred to hereinbelow as "XZ polarized light". The linearly polarized light that is incident perpendicularly on the film surface and has vibration plane of its electric vector in the YZ plane is appropriately referred to hereinbelow as "YZ polarized light". The aforementioned requirement is appropriately referred to hereinbelow as "requirement P". Usually, in the resin layered body, the phase of the XZ polarized light with respect to the phase of the YZ polarized light is delayed when the uniaxial stretching is performed at the temperature T1 in the X axis direction and advanced when the uniaxial stretching is performed at the temperature T2 in the X axis direction.

The requirement P should be satisfied when at, least one of a variety of in-plane directions in the plane of the resin layered body is taken as the X axis. Usually, the resin layered body is an isotropic (i.e., having no anisotropy) raw film. Therefore, when the requirement P is satisfied with one in-plane direction set to be the X axis, the requirement P may be satisfied with any other in-plane direction set to be the X axis.

Generally, in a film in which an in-plane slow axis appears along the X axis as a result of uniaxial stretching, the phase of the XZ polarized light is delayed with respect to the phase of the YZ polarized light. In contrast, in a film in which a fast axis appears along the X axis as a result of uniaxial stretching, the phase of the XZ polarized light is advanced with respect to the phase of the YZ polarized light. The resin layered body that meets the requirement P is a layered body that utilizes these properties and is usually a film in which the appearance of the in-plane slow or fast axis depends on stretching temperature. The temperature dependence of the appearance of retardation may be controlled by, e.g., adjusting the relationship between the photoelastic coefficients of the resin A1, the resin B, and the resin A2 and the thickness ratios of the layers.

The conditions that the resin layered body should meet will be described referring to an "in-plane retardation with reference to the direction of stretching" as an example. The in-plane retardation with reference to the direction of stretching is defined as a value obtained by multiplying the difference between the refractive index nX in the X axis direction which is the direction of stretching and the refractive index nY in the Y axis direction which is an in-plane direction orthogonal to the direction of stretching (=nX−nY) by thickness d. In this case, the in-plane retardation with reference to the direction of stretching which can be expressed in the resin layered body in its entirety including the layer a1, the layer b, and the layer a2 when the resin layered body is stretched is obtained by combining the in-plane retardation with reference to the direction of stretching that is expressed in the layer a1, the in-plane retardation with reference to the direction of stretching that is expressed in the layer b, and the in-plane retardation with reference to the direction of stretching that is expressed in the layer a2. In order to realize reversal relationship of the positivity/negativity of the in-plane retardation with reference to the direction of stretching which is expressed when the resin layered body including the layer a1, the layer b, and the layer a2 is stretched at the higher temperature T1 with respect to the positivity/negativity of that at the lower temperature T2, it is preferable that the thicknesses of the layer a1, the layer b, and the layer a2 is adjusted such that the following conditions (i) and (ii) are met.

(i) As a result of stretching at the lower temperature T2, the absolute value of the retardation expressed in the resin with a higher glass transition temperature is smaller than the absolute value of the retardation expressed in the resin with a lower glass transition temperature.

(ii) As a result of stretching at the higher temperature T1, the absolute value of the retardation expressed in the resin with a lower glass transition temperature is smaller than the absolute value of the retardation expressed in the resin with a higher glass transition temperature.

By controlling the difference between the refractive index nX in the X axis direction and the refractive index nY in the Y axis direction that are expressed in each of the layer a1, the layer b, and the layer a2 as a result of stretching in one direction (i.e., uniaxial stretching) and also controlling the total thickness of the layer a1, the total thickness of the layer b, and the total thickness of the layer a2, a resin layered body that satisfies the requirement P (the requirement P is the requirements that the phase of the XZ polarized light with respect to the phase of the YZ polarized light is delayed when the uniaxial stretching is performed in the X axis direction at one of the temperatures T1 and T2 and advanced when the uniaxial stretching is performed in the X axis direction at the other one of the temperatures T1 and T2) can be obtained.

The expression of the in-plane retardation with reference to the direction of stretching when the resin layered body satisfying the requirement P is stretched will be more specifically described with reference to the drawings. FIG. 1 shows an example of the temperature dependence of retardation with reference to the direction of stretching when each of the layer a1, the layer a2, and the layer b in the resin layered body is stretched at a given stretching ratio and a given stretching speed and an example of the temperature dependence of retardation A with reference to a stretching direction when the resin layered body is stretched, under the assumption that the resin A1 and the resin A2 are the same resin, the glass transition temperature $Tg_{A1}$ of the resin A1 (or A2) constituting the layer a1 and the layer a2 is high, and the glass transition temperature $Tg_B$ of the resin B constituting the layer b is low. In the resin layered body as shown in FIG. 1, when stretching is performed at a temperature Tb, the negative retardation with reference to the stretching direction that is expressed in the layer b is larger than the positive retardation with reference to the stretching direction that is expressed in the layer a1 and the layer a2, so that the retardation A with reference to the stretching direction that is expressed in the resin layered body in its entirety is negative. However, when stretching is performed at a temperature Ta, the negative retardation with reference to the stretching direction that is expressed in the layer b is smaller than the positive retardation with reference to the stretching direction that is expressed in the layer a1 and the layer a2, so that the retardation A with reference to the stretching direction that is expressed in the resin layered body in its entirety is positive.

Therefore, by combining the stretching at the temperature Ta and the stretching at the temperature Tb different from Ta, the retardations expressed as a result of the stretching operations at respective temperatures are combined, and a layered phase difference film having a desired retardation and therefore having a desired optical function can be stably achieved.

For example, the first stretching step is performed at the temperature Ta to bring about expression of a positive retardation with reference to the stretching direction in each of the layer a1 and the layer a2 and expression of a negative retardation with reference to the stretching direction in the layer b. Subsequently, the second stretching step is performed at the temperature Tb and a stretching ratio less than that in the first stretching step in an in-plane direction orthogonal to the stretching direction in the first stretching step. In the second stretching step, a retardation is expressed in each of the layer a1 and the layer a2 such that the in-plane retardation expressed in the first stretching step is cancelled, and at the same time, a retardation is expressed in the layer b in a direction orthogonal to the retardation expressed in the first stretching step. Consequently, the resin layer A1 and the resin layer A2 obtained by stretching the layer a1 and the layer a2 can become negative C-plates, and the resin layer B obtained by stretching the layer b can become a positive B-plate.

The specific thicknesses of the layer a1, the layer b, and the layer a2 may be set in accordance with the desired retardation of a layered phase difference film to be produced such that the aforementioned requirement P is satisfied. In this case, preferably, the ratio of the total thickness of the layer a1 and the layer a2 with respect to the total thickness of the layer b is set within a desired range. The aforementioned ratio is represented by "(the total thickness of the layer a1+the total thickness of the layer a2)/(the total thickness of the layer b)". The specific range of the aforementioned ratio is preferably 1/15 or more and more preferably 1/10 or more, and is preferably 1/4 or less. Consequently, temperature dependence of the retardation expression by the stretching treatment can be increased.

The total thickness of the layer a1, the layer b, and the layer a2 is preferably 10 μm or more, more preferably 20 μm or more, and particularly preferably 30 μm or more, and is preferably 500 μm or less, more preferably 200 μm or less, and particularly preferably 150 μm or less. When the total thickness of the layer a1, the layer b, and the layer a2 is equal to or more than the lower limit of the aforementioned range, sufficient retardation can be expressed. In addition, mechanical strength of the layered phase difference film can be increased. When the total thickness is equal to or less than the upper limit, the layered phase difference film can have high flexiblity, so that its handleability can be increased.

It is preferable that, in the resin layered body, variations in the thickness of each of the layer a1, the layer b, and the layer a2 are 1 μm or less over the entire surface. Consequently, unevenness in the color tone of the layered phase difference film can be reduced. In addition, changes in the color tone after long-term use of the layered phase difference film can be made uniform.

To confine the variations in the thickness of each of the layer a1, the layer b, and the layer a2 to 1 μm or less over the entire surface as described above, the following (1) to (6), e.g., may be performed.

(1) A polymer filter with a mesh size of 20 μm or less is provided in an extruder.

(2) A gear pump is rotated at 5 rpm or more.

(3) Enclosing means is provided around a die.

(4) An air gap is set to 200 mm or less.

(5) Edge pinning is performed when a film is casted onto a cooling roll.

(6) A twin screw extruder or a single screw extruder having a double-flight type screw is used as the extruder The thickness of each of the layers may be determined by measuring the total thickness of the film using a commercial contact type thickness meter; cutting the film at the position used for the aforementioned thickness measurement and observing the cross-section under an optical microscope to determine the ratio of the thicknesses of the layers; and calculating the thickness of each of the layers from the determined ratio. This procedure is repeated at positions with regular intervals in the MD direction and TD direction of the film, and the arithmetic average and variations of thickness may be determined.

The variations in thickness are calculated from the following formula using the arithmetic average value $T_{ave}$ of the aforementioned measured values as a reference, the maximum value $T_{max}$ of the measured thicknesses T, and the minimum value $T_{min}$.

Variations in thickness (μm)=larger one of "$T_{ave}-T_{min}$" and "$T_{max}-T_{ave}$".

The total light transmittance, haze, ΔYI, and JIS pencil hardness of the resin layered body are similar to those of the layered phase difference film. In addition, in the resin layered body, as in the layered phase difference film, it is preferable that the outer surface of the resin layered body is flat with substantially no linear concave portions and no linear convex portions.

The resin layered body may have an optional layer in addition to the layer a1, the layer b, and the layer a2, so long as the effects of the present invention are not significantly impaired. Examples of the optional layer may include the same layers as those that may be included in the layered phase difference film. Such an optional layer may be provided after the resin layered body is obtained by co-extrusion described later or may be provided by co-extruding the material forming the optional layer together with the resin A1, the resin B, and the resin A2 when the resin A1, the resin B, and the resin A2 are co-extruded.

The width size of the resin layered body is preferably 500 mm or more, and is preferably 2,000 mm or less. The lengthwise size of the resin layered body may be arbitrary set, and the resin layered body is preferably a long-length film.

No limitation is imposed on the method for producing the resin layered body. However, it is preferable to produce the resin layered body by a co-extrusion method or a co-flow casting method using the resin A1, the resin B, and the resin A2. Of these, the co-extrusion method is preferable. The co-extrusion method is a method in which a plurality of molten resins are extruded for molding. The co-extrusion method is excellent because of production efficiency and because a volatile component such as a solvent does not remain in the resin layered body.

Examples of the co-extrusion method may include a co-extrusion T-die method, a co-extrusion inflation method, and a co-extrusion lamination method. Of these, the co-extrusion T-die method is preferable. Examples of the co-extrusion T-die method may include a feed block co-extrusion T-die method and a multi-manifold co-extrusion T-die method. Of these, the multi-manifold co-extrusion T-die method is particularly preferable because variations in the thickness of each of the layer a1 and the layer a2 can thereby be reduced.

When the co-extrusion T-die method is used, the temperature for melting the resins in an extruder having the T-die is set to be preferably (Tg+80° C.) or higher and more preferably (Tg+100° C.) or higher, and is preferably (Tg+180° C.) or lower and more preferably (Tg+150° C.) or lower, where Tg is the glass transition temperature of each of the resins. When the temperature for melting the resins in the extruder is equal to or higher than the lower limit of the aforementioned range, the flowability of the resins can be sufficiently increased. When the temperature is equal to or lower than the upper limit, deterioration of the resins can be prevented.

It is preferable that the film-shaped molten resins extruded from the opening of the die are caused to adhere to cooling drums. Consequently, the molten resins are rapidly cured, and a desired resin layered body can be efficiently obtained.

No particular limitation is imposed on the method for causing the molten resins to adhere to the cooling drums. Examples of the method may include an air knife method, a vacuum box method, and an electrostatic adhesion method.

No particular limitation is imposed on the number of cooling drums, but the number of cooling drums is usually two or more. No particular limitation is imposed on the manner of arrangement of the cooling drums. Examples of the manner of arrangement may include linear type, Z type, and L type arrangements. No particular limitation is imposed on the manner of passing the molten resins that have been extruded from the opening of the die through the cooling drums.

Usually, the degree of adhesion of the extruded film-shaped resins to the cooling drums varies depending on the temperature of the cooling drums. Therefore, the temperature of the cooling drums is set to be preferably (Tg+30° C.) or lower and more preferably within the range of (Tg−5° C.) to (Tg−45° C.), where Tg is the glass transition temperature of a resin in a layer that comes into contact with the drums among the resins extruded from the die. When the temperature of the cooling drums is equal to or higher than the lower limit of the aforementioned range, favorable adhesion of the resins to the cooling drums can be achieved. When the temperature is equal to or lower than the upper limit, the film-shaped resins can be easily separated from the cooling drums. When the temperature of the cooling drums is within the aforementioned range, problems such as sliding and flaws can be prevented.

It is preferable that the amount of a solvent remaining in the resin layered body is reduced. Examples of means for reducing the amount of the solvent may include: (1) means in which the amount of the solvent remaining in the resins used as raw materials is reduced; and (2) means in which the resins are pre-dried before the resin layered body is formed. The pre-drying is performed using a hot air dryer etc. after the resins are formed into, e.g., pellets. The drying temperature is preferably 100° C. or higher, and the drying time is preferably 2 hours or longer. By performing the pre-drying, the amount of the solvent remaining in the resin layered body can be reduced, and the extruded film-shaped resins can be prevented from being foamed.

[9. First Stretching Step]

In the first stretching step, the resin layered body is stretched in one direction at the temperature T1. That is, the resin layered body is uniaxially stretched at the temperature T1. In this case, the direction in which the resin layered body is stretched in the first stretching step is the first direction. As a result of performing such a first stretching step, the layer a1, the layer b, and the layer a2 included in the resin layered body are co-stretched. When these layers are stretched at the temperature T1, retardation is expressed in each of the layer a1, the layer b, and the layer a2 in accordance with the configuration of the resin layered body and the stretching conditions such as the stretching temperature T1 and the stretching ratio, and retardation as the entirety of the resin layered body including the layer a1, the layer b, and the layer a2 is also expressed. In this case, e.g., when the resin layered body satisfies the requirement P, the phase of the XZ polarized light with respect to the phase of the Y2 polarized light is delayed or advanced.

The temperature T1 may be set to an appropriate temperature such that a desired retardation is obtained. For example, when the glass transition temperature $Tg_{A1}$ of the resin A1 and the glass transition temperature $Tg_{A2}$ of the resin A2 are higher than the glass transition temperature $Tg_B$ of the resin B, it is preferable to set the temperature T1 as follows. With reference to the glass transition temperature $Tg_{A1}$ of the resin A1, the glass transition temperature $Tg_B$ of the resin B, and the glass transition temperature $Tg_{A2}$ of the resin A2, the temperature T1 is preferably higher than $Tg_B$, more preferably higher than ($Tg_B$+5° C.), and still more preferably higher than ($Tg_B$+10° C.), and is preferably lower than (a higher one of $Tg_{A1}$ and $Tg_{A2}$+20° C.) and more preferably lower than (the higher one of $Tg_{A1}$ and $Tg_{A2}$+10° C.). When the temperature T1 is higher than the lower limit of the aforementioned temperature range, the in-plane retardation $Re_B$ of the resin layer B and its retardation $Rth_B$ in the thickness direction can be stably set within the desired ranges. When the temperature T1 is lower than the upper limit of the aforementioned temperature range, the in-plane retardation $Re_m$ of the resin layer A1, its retardation $Rth_m$ in the thickness direction, the in-plane retardation $Re_{A2}$ of the resin layer A2, and its retardation $Rth_{A2}$ in the thickness direction can be stably set within the desired ranges.

The stretching ratio in the first stretching step is preferably 1.1 times or more, and is preferably less than 2.0 times, more preferably less than 1.8 times, and particularly preferably less than 1.6 times. When the stretching ratio in the first stretching step is equal to or more than the lower limit of the aforementioned range, the retardation of the layered phase difference film in the thickness direction can be sufficiently expressed. When the stretching ratio is less than the upper limit, the in-plane retardations expressed in the first stretching step can be reduced, so that the resin layer A1 and the resin layer A2 can be easily formed as C-plates and the resin layer B can be easily formed as a B-plate.

The stretching speed in the first stretching step is preferably 1.1 times/minute or more, and is preferably 2.0 times/minute or less, more preferably 1.8 times/minute or less, and particularly preferably 1.6 times/minute or less. When the stretching speed is equal to or more than the lower limit of the aforementioned range, productivity can be improved. When the stretching speed is equal to or less than the upper limit, variations in retardation can be reduced.

The uniaxial stretching may be performed using any method publicly known in prior art. Examples of the uniaxial stretching method may include: a method in which uniaxial stretching is performed in a lengthwise direction (usually, the lengthwise direction coincides with the MD direction) by utilizing the difference in peripheral speed between rolls; and a method in which uniaxial stretching is performed in a crosswise direction (usually, the crosswise direction coincides with the TD direction) using a tenter. Examples of the method for uniaxial stretching in the lengthwise direction may include an IR heating method between rolls and a floating method. Of these, the floating method is preferable because a layered phase difference film with high optical uniformity can be obtained. Examples of the method for uniaxial stretching in the crosswise direction may include a tenter method.

During the stretching, a temperature gradient in the width direction of the resin layered body may be given in a stretching zone, for reducing stretching unevenness and unevenness in thickness. For giving a temperature gradient in the width direction in the stretching zone, any publicly known method may be used. For example, the degree of opening of hot air nozzles is controlled in the width direction, or IR heaters are arranged in the width direction to control heating.

In the layered phase difference film of the present invention, the resin layer B usually has an in-plane slow axis parallel to the first direction in which the resin layered body is stretched in the first stretching step. Therefore, usually, the in-plane slow axis of the layered phase difference film in its entirety is also parallel to the first direction. It is thus preferable that the first direction is set to be parallel to the direction in which an in-plane slow axis is desired to be expressed in the layered phase difference film to be produced.

[10. Second Stretching Step]

After the first stretching step, the second stretching step is performed. In the second stretching step, the resin layered body that has been stretched in the first direction in the first stretching step is stretched in the second direction that is orthogonal to the first direction within the plane of the resin layered body.

In the second stretching step, the resin layered body is stretched at temperature T2 that is lower than temperature T1. That is, the resin layered body is uniaxially stretched at the temperature T2 that is a relatively low temperature. As a result of the stretching at the temperature T2, retardation is expressed in each of the layer a1, the layer b, and the layer a2 in accordance with the configuration of the resin layered body and the stretching conditions such as the stretching temperature T2 and the stretching ratio, and retardation as the entirety of the resin layered body including the layer a1, the layer b, and the layer a2 is also expressed. In this case, e.g., when the resin layered body satisfies the requirement P, the following results. When the phase of the XZ polarized light has been delayed with respect to the phase of the YZ polarized light as a result of the stretching in the first stretching step, the phase of the XZ polarized light is advanced with respect to the phase of the YZ polarized light as a result of the stretching in the second stretching step. When the phase of the XZ polarized light has been advanced with respect to the phase of the YZ polarized light as a result of the stretching in the first stretching step, the phase of the XZ polarized light is delayed with respect to the phase of the YZ polarized light as a result of the stretching in the second stretching step.

The temperature T2 may be set to an appropriate temperature such that a desired retardation is obtained.

For example, when the glass transition temperature $Tg_{A1}$ of the resin A1 and the glass transition temperature $Tg_{A2}$ of the resin A2 are higher than the glass transition temperature $Tg_B$ of the resin B, it is preferable to set the temperature T2 as follows. With reference to the glass transition temperature $Tg_B$ of the resin B, the temperature T2 is preferably higher than ($Tg_B$−20° C.) and more preferably higher than ($Tg_B$−10° C.), and is preferably lower then ($Tg_B$+5° C.) and more preferably lower than $Tg_B$. When the stretching temperature T2 is higher than the lower limit of the aforementioned temperature range, rupture and clouding of the resin layered body during stretching can be prevented. When the stretching temperature T2 is equal to or lower than the upper limit, the retardations $Re_B$ and $Rth_B$ of the resin layer B can be stably set within the desired ranges.

The difference between the temperature T1 and the temperature T2 is preferably 5° C. or higher and more preferably 10° C. or higher. When the difference between the temperature T1 and the temperature T2 is as high as described above, the layered phase difference film can stably express the polarizing plate compensation function. No limitation is imposed on the upper limit of the difference between the temperature T1 and the temperature T2, but the difference is 100° C. or lower from the viewpoint of industrial productivity.

It is preferable that the stretching ratio in the second stretching step is smaller than the stretching ratio in the first stretching step. The specific stretching ratio in the second stretching step is preferably 1.1 times or more, more preferably 1.2 times or more, and particularly preferably 1.3 times or more, and is preferably 2.4 times or less, more preferably 2.2 times or less, and particularly preferably 2.0 times or less. When the stretching ratio in the second stretching step is within the aforementioned range, the in-plane retardation of the resin layer A1 and the in-plane retardation of the resin layer A2 can be reduced, so that the resin layer A1 and the resin layer A2 can be formed as C-plates.

The stretching speed in the second stretching step is preferably 1.1 times/minute or more, more preferably 1.2 times/minutes or more, and particularly preferably 1.3 times/minute of more, and is preferably 2.4 times/minute or less, more preferably 2.2 times/minute or less, and particularly preferably 2.0 times/minute or less. When the stretching speed is equal to or more than the lower limit of the aforementioned range, productivity can be increased. When the stretching speed is equal to or less than the upper limit, variations in retardation can be reduced.

As the stretching in the second stretching step, uniaxial stretching is performed. The specific method for the uniaxial stretching may be any of the methods employable for the uniaxial stretching in the first stretching step.

The combination of the stretching direction in the first stretching step and the stretching direction in the second stretching step may be any combination. For example, the stretching in the first stretching step may be performed in the lengthwise direction, and the stretching in the second stretching step may be performed in the crosswise direction. Alternatively, the stretching in the first stretching step may be performed in the crosswise direction, and the stretching in the second stretching step may be performed in the lengthwise direction. Still further, the stretching in the first stretching step may be performed in a diagonal direction, and the stretching in the second stretching step may be performed in another diagonal direction orthogonal to the aforementioned diagonal direction. A diagonal direction is a direction not parallel to the lengthwise direction nor the crosswise direction. Particularly, it is preferable to perform the stretching in the first stretching step in the crosswise direction and perform the stretching in the second stretching step in the lengthwise direction. When the stretching in the second stretching step with a small stretching ratio is performed in the lengthwise direction, variations in the directions of optical axes can be reduced over the entire width of the layered phase difference film obtained.

When the first stretching step and the second stretching step are performed on the resin layered body in the aforementioned manner, retardation is expressed in the layer a1, the layer b, and the layer a2 as a result of each of the first stretching step and the second stretching step in accordance with the stretching conditions such as the stretching temperature, stretching direction, and stretching ratio. Therefore, in the layered phase difference film obtained through the first stretching step and the second stretching step, the retardations expressed in the layer a1, the layer b, and the layer a2 as a result of each of the first stretching step and the second stretching step are combined, and a retardation that is sufficient for providing optical functions such as the polarizing plate compensation function is thereby expressed. With the production method including the first stretching step and the second stretching step, a layered phase difference film having a desired retardation can thus be obtained.

In the aforementioned production method, the resin layered body including the layer a1, the layer b, and the layer a2 is stretched to obtain the resin layer A1, the resin layer B, and the resin layer A2. Therefore, as compared with the case in which the resin layer A1, the resin layer B, and the resin layer A2 are prepared separately and then bonded to each other to produce a layered phase difference film, the production process can be shortened, and the production cost can be reduced, because application and curing of the adhesive are unnecessary. In addition, since it is not necessary to adjust bonding angles, accuracy of the directions of the in-plane slow axes can be easily increased, and the product is expected to have improved quality.

In the aforementioned production method, by controlling, e.g., the stretching ratio and the stretching temperature in each of the first stretching step and the second stretching step, the in-plane retardation and the retardation in the thickness direction of each of the resin layer A1, the resin layer B, and the resin layer A2 in the layered phase difference film can be controlled.

[11. Optional Steps]

In the aforementioned method for producing the layered phase difference film, an optional step may be performed in addition to the aforementioned first and second stretching steps.

For example, a step of pre-heating the resin layered body (a pre-heating step) may be provided before the resin layered body is stretched. Examples of the means for heating the resin layered body may include an oven-type heating device, a radiation heating device, and immersion into a liquid. Of these, an oven-type heating device is preferable. The heating temperature in the pre-heating step is preferably (stretching temperature−40° C.) or higher and more preferably (stretching temperature−30° C.) or higher, and is preferably (stretching temperature+20° C.) or lower, and more preferably (stretching temperature+15° C.) or lower. The stretching temperature herein means the temperature at which the temperature of the heating device is set.

Further, e.g., after the first stretching step, after the second stretching step, or both after the first stretching step and after the second stretching step, the stretched film may be subjected to fixing treatment. The temperature in the fixing treatment is preferably room temperature or higher and more preferably (stretching temperature−40° C.) or higher, and is preferably (stretching temperature+30° C.) or lower and more preferably (stretching temperature+20° C.) or lower.

Moreover, e.g., the step of providing an optional layer such as a mat layer, a hard coat layer, an anti-reflection layer, an anti-fouling layer, etc. on the surface of the obtained layered phase difference film may be performed.

[12. Liquid Crystal Display Device]

The layered phase difference film of the present invention has an excellent polarizing plate compensation function. Therefore, the layered phase difference film alone or a combination thereof with another member is applicable to a display device such as a liquid crystal display device, an organic electroluminescent display device, a plasma display device, an FED (field emission display) device, an SED (surface field emission display) device, etc. Particularly, the layered phase difference film of the present invention is suitably used for a liquid crystal display device.

Usually, a liquid crystal display device includes a pair of polarizers having mutually orthogonal absorption axes (a light-incident side polarizer and a light-emission side polarizer) and a liquid crystal cell disposed between the pair of polarizers. When the layered phase difference film of the present invention is disposed in the liquid crystal display device, the layered phase difference film may be disposed between the pair of polarizers. In this case, the layered phase difference film may be disposed between the liquid crystal cell and the light-incident side polarizer. The layered phase difference film may also be disposed, e.g., between the liquid crystal cell and the light-emission side polarizer. Further, the layered phase difference film may also be disposed, e.g., both between the liquid crystal cell and the light-incident side polarizer and between the liquid crystal cell and the light-emission side polarizer. Usually, the pair of polarizers, the layered phase difference film, and the liquid crystal cell are integrally provided as a liquid crystal panel. The liquid crystal panel is irradiated with light from a light source, and an image is thereby displayed on a display surface on the light emission side of the liquid crystal panel. In this case, usually, since the layered phase difference film has an excellent polarizing plate compensation function, light leakage when the display surface of the liquid crystal display device is viewed obliquely can be reduced. In the liquid crystal display device including the layered phase difference film of the present invention, front brightness when black color is displayed can be sufficiently reduced. Usually, since the layered phase difference film of the present invention has excellent optical functions in addition to the polarizing plate compensation function, visibility of the liquid crystal display device can be further improved.

Examples of the driving mode of the liquid crystal cell may include an in-plane switching (IPS) mode, a vertical alignment (VA) mode, a multi-domain vertical alignment (MVA) mode, a continuous pinwheel alignment (CPA) mode, a hybrid alignment nematic (HAN) mode, a twisted nematic (TN) mode, a super twisted nematic (STN) mode, and an optical compensated bend (OCB) mode. Of these, the in-plane switching mode and the vertical alignment mode are preferable, and the in-plane switching mode is particularly preferable. A liquid crystal cell using the in-plane switching mode has a wide viewing angle. When the layered phase difference film is applied thereto in the aforementioned manner, the viewing angle can be further widened.

The layered phase difference film may be laminated onto, e.g., the liquid crystal cell or the polarizer. Any publicly known adhesive may be used for lamination.

One layered phase difference film may be used alone, and two or more layered phase difference films may also be used.

When the layered phase difference film is disposed in the liquid crystal display device, the layered phase difference film of the present invention may be used in combination with another phase difference film. For example, when the layered phase difference film of the present invention is disposed in a liquid crystal display device including a liquid crystal cell of the vertical alignment mode, another phase difference film for improving the viewing angle property may be disposed between a pair of polarizers in addition to the layered phase difference film of the present invention.

[13. Others]

The layered phase difference film of the present invention is applicable to uses other than the aforementioned use.

For example, by setting the in-plane retardation Re of the layered phase difference film of the present invention to 120 nm to 160 nm, the layered phase difference film can serve as a quarter-wave plate. When this quarter-wave plate is used in combination with a linear polarizer, a circularly polarizing plate can be obtained. In this case, the angle between the in-plane slow axis of the quarter-wave plate and the absorption axis of the linear polarizer is preferably 45±2°.

The layered phase difference film may also be used as a protective film for a polarizing plate. The polarizing plate usually includes a polarizer and protective films laminated onto both sides of the polarizer. By laminating the layered phase difference films onto the polarizer, these layered phase difference films can be used as protective films. In this case, since the protective films can be omitted, a thin liquid crystal display device can be realized.

EXAMPLES

The present invention will be specifically described hereinbelow by way of Examples. However, the present invention is not limited to the following Examples and may be implemented with any modifications without departing from the scope of the claims of the present invention.

Unless otherwise specified, "%" and "part" representing an amount in the following description are based on weight. Unless otherwise specified, the operations in the following description were performed under the conditions of room temperature and normal pressure.

[Evaluation Methods]

(Method for Measuring Thickness)

Thickness of the film was measured using a contact-type thickness meter.

Thickness of each of the layers contained in the film was measured as follows. The film was embedded in an epoxy resin and then sliced using a microtome ("RUB-2100" manufactured by Yamato Kogyo Co., Ltd.), and the cross-section was observed under a scanning electron microscope for measurement.

(Method for Measuring Retardation)

In-plane retardation of the layered phase difference film, its retardation in the thickness direction, in-plane retardations of the respective, layers included in the layered phase difference film, and their retardations in the thickness direction were measured using a spectroscopic ellipsometer ("M-2000U" manufactured by J. A. Woollam). The measurement wavelength was 550 nm. The measurement was performed at a position from an edge of the layered phase difference film at a distance of 50 mm, the edge being right side when the viewer faces against its moving direction.

Particularly, the in-plane retardations of the respective layers included in the layered phase difference film and their retardations in the thickness direction were measured as follows. First, the surface of the layered phase difference film was polished with an abrasive cloth for plastics to obtain each of the layers as single layers. In this state, for each of the layers, the refractive index nx in an in-plane direction giving the maximum refractive index, the refractive index ny in an in-plane direction perpendicular to the direction of nx, and the refractive index nz in the thickness direction were measured. The in-plane retardation Re of each of the layers and its retardation Rth in the thickness direction were calculated using the measured refractive index values nx, ny, and nz and the thickness d of each of the layers.

(Method for Measuring Direction of Slow Axis)

The direction of the in-plane slow axis of the layered phase difference film was measured with the aforementioned spectroscopic ellipsometer at a position from an edge of the layered phase difference film at a distance of 50 mm, the edge being right side when the viewer faces against its moving direction.

(Method for Evaluating Front Brightness and Light Leakage)

Figure 2:
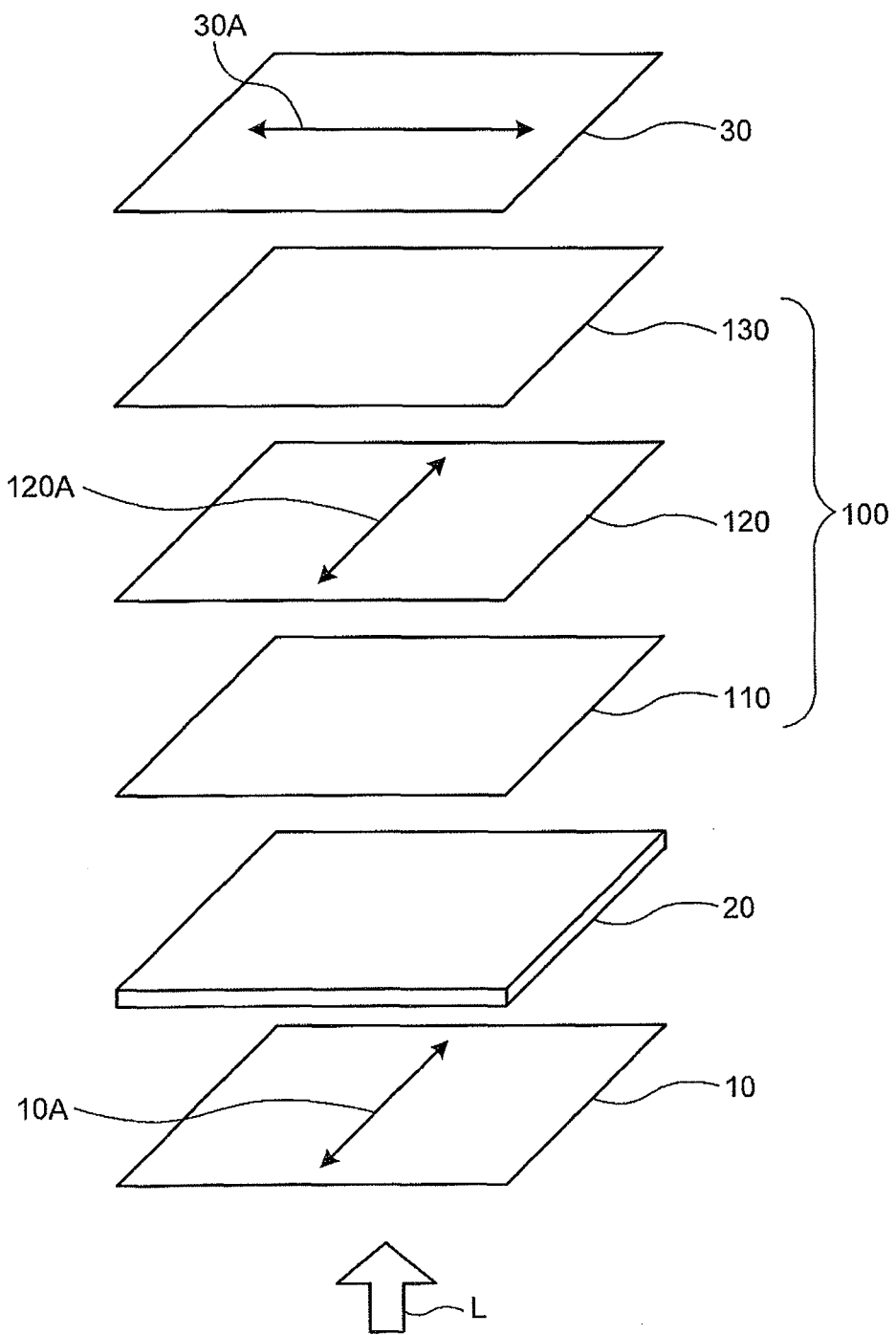
FIG. 2 is a perspective view schematically illustrating an evaluation system that was set in a simulator in order to evaluate front brightness and light leakage when black color is displayed in each of Examples and Comparative Examples.

FIG. 2 is a perspective view schematically illustrating an evaluation system that was set in a simulator in order to evaluate front brightness and light leakage when black color is displayed in each of Examples and Comparative Examples.

A liquid crystal display simulator ("LCD MASTER" manufactured by Shintech Inc.) was used to set the evaluation system shown in FIG. 2. The evaluation system shown in FIG. 2 was a stack of an incident-side polarizing plate (10), a liquid crystal cell (20), a layered phase difference film (100), and an emission-side polarizing plate (30). In this case, the incident-side polarizing plate (10), the liquid crystal cell (20), a resin layer A2 (110), a resin layer B (120), a resin layer A1 (130), and the emission-side polarizing plate (30) were stacked in this order. The absorption axis (10A) of the incident-side polarizing plate (10) and the absorption axis (30A) of the emission-side polarizing plate (30) were placed orthogonal to each other when viewed in the thickness direction. The absorption axis (10A) of the incident-side polarizing plate (10) and the slow axis (120A) of the resin layer B (120) were set parallel to each other. Light from an unillustrated backlight was directed onto the incident-side polarizing plate (10) in the thickness direction as shown by an arrow L.

In the aforementioned evaluation system, black color is displayed, and the brightness when the liquid crystal display device was viewed from the front direction and the maximum brightness (light leakage) when the liquid crystal display device was viewed from all directions were measured by simulations, and the results were represented by relative values with the values in Example 1 set to 1.

For the calculation, the data of the following optical components was used.

1. As the data for the liquid crystal cell, those of iPad 2 were used. These liquid crystal cell data used were obtained by disassembling iPad 2 and measuring the liquid crystal material and the orientation of the liquid crystal.
2. As the data for the polarizing plate, those of G1029DU (manufactured by Nitto) included in LCD Master were used.
3. As the data for the backlight, those of D65 included in LCD Master were used.

Example 1

A film molding apparatus for two-type three-layer co-extrusion molding was prepared. This film molding apparatus is an apparatus of the type in which two types of resins are used to form a film having three layers.

Pellets of a polycarbonate resin ("WONDERLITE PC-115" manufactured by Chi Mei, glass transition temperature: 140° C.) were prepared as a resin having a positive intrinsic birefringence. These pellets were fed to one of single screw extruders equipped with a double-flight type screw and then melted.

Pellets of a styrene-maleic anhydride copolymer resin ("Dylark D332" manufactured by Nova Chemicals, glass transition temperature 130° C.) were prepared as a resin having a negative intrinsic birefringence. These pellets were fed to the other one of the single screw extruders equipped with a double-flight type screw and then melted.

The molten polycarbonate resin at 260° C. was passed through a leaf disc-shaped polymer filter with a mesh size of 10 μm and then supplied to one of manifolds of a multi-manifold die (surface roughness of the die lip: Ra=0.1 μm). The molten styrene-maleic anhydride copolymer resin at 260° C. was passed through a leaf disc-shaped polymer filter with a mesh size of 10 μm and supplied to the other one of the manifolds.

The polycarbonate resin and the styrene-maleic anhydride copolymer resin were extruded simultaneously from the multi-manifold die at 260° C. to obtain a three-layer structure film-shaped molten resin including (a layer a1 formed of the polycarbonate resin)/(a layer b formed of the styrene-maleic anhydride copolymer resin)/(a layer a2 formed of the polycarbonate resin). The film-shaped molten resin was casted onto a cooling roll having a surface temperature controlled to 130° C. and then passed between two cooling rolls having a surface temperature controlled to 50° C. to thereby obtain a resin layered body. This resin layered body included a polycarbonate resin layer (the layer a1, thickness: 12 μm), a styrene-maleic anhydride copolymer resin layer (the layer b, thickness: 89 μm), and a polycarbonate resin layer (the layer a2, thickness: 2 μm) in this order. Edge portions of both ends in width direction of the obtained resin layered body were cut off, whereby a resin layered body having a width of 1,450 mm was obtained.

The resin layered body thus obtained was supplied to a tenter crosswise uniaxial stretching machine and stretched in the crosswise direction over 1 minute at a stretching temperature of 135° C. and a stretching ratio of 1.5 times (the first stretching step). After the stretching, edge portions of both ends in width direction of the resin layered body were cut off to adjust the width to 1,600 mm.

Subsequently, the resultant resin layered body was supplied to a lengthwise uniaxial stretching machine and stretched in the lengthwise direction over 1 minute at a stretching temperature of 120° C. and a stretching ratio of 1.17 times to obtain a layered phase difference film (the second stretching step). Edge portions of both ends in width direction of the layered phase difference film were cut off to adjust the width to 1,300 mm.

Then the resultant layered phase difference film was heated at 122° C. for 1 minute to fix its orientation state (fixing treatment). In this case, edge portions of both ends in width direction of the layered phase difference film were secured, so that the width size of the layered phase difference film was fixed to 0.995 times the size immediately after completion of the stretching in the lengthwise direction. Then edge portions of both ends in width direction of the layered phase difference film were cut off to adjust the width to 1,200 mm.

In this manner, a layered phase difference film including the resin layer A1, the resin layer B, and the resin layer A2 in this order was obtained. The obtained layered phase difference film was evaluated in the aforementioned manner.

Examples 2 to 6 and Comparative Examples 1 and 2

By changing the opening width of the multi-manifold die, the thicknesses of the layers included in the resin layered body were changed as shown in the following Table 1 or 2. In addition, the film width after edge portions of both ends in width direction were cut off, the stretching ratio, the stretching temperature, and the stretching time were changed as shown in the following Table 1 or 2.

Layered phase difference films each including the resin layer A1, the resin layer B, and the resin layer A2 in this order were obtained in the same manner as in Example 1 except for the aforementioned changes. The obtained layered phase difference films were evaluated in the aforementioned manner.

[Results]

The results of Examples 1 to 6 and Comparative Examples 1 and 2 are shown in Tables 1 and 2. The meanings of abbreviations in the tables are as follows.

Re: In-plane retardation

Rth: Retardation in the thickness direction

Slow axis direction: The direction of the in-plane slow axis of a layer when the direction of the absorption axis of the emission-side polarizing plate is set to be a 90° direction. In this case, the slow axis direction is the direction of the slow axis at a position from an edge of the layered phase difference film at a distance of 50 mm, the edge being right side when the viewer faces against its moving direction.

TABLE 1

| | | Results of Examples 1-6 | | | | | |
|---|---|---|---|---|---|---|---|
| | | Ex. 1 | Ex. 2 | Ex. 3 | Ex. 4 | Ex. 5 | Ex. 6 |
| Size of resin | Layer a1 thickness (μm) | 12 | 14 | 12 | 10 | 13 | 12 |

TABLE 1-continued

Results of Examples 1-6

| | | Ex. 1 | Ex. 2 | Ex. 3 | Ex. 4 | Ex. 5 | Ex. 6 |
|---|---|---|---|---|---|---|---|
| layered body | Layer b thickness (μm) | 89 | 89 | 89 | 89 | 107 | 121 |
| | Layer a2 thickness (μm) | 2 | 2 | 4 | 2 | 2 | 2 |
| | Film width (mm) | 1450 | 1450 | 1450 | 1450 | 1450 | 1450 |
| Crosswise stretching | Stretching ratio (times) | 1.5 | 1.5 | 1.5 | 1.5 | 1.5 | 1.5 |
| | Stretching temperature (° C.) | 135 | 135 | 135 | 135 | 135 | 135 |
| | Stretching time (min) | 1 | 1 | 1 | 1 | 1 | 1 |
| | Film width (mm) | 1600 | 1600 | 1600 | 1600 | 1600 | 1600 |
| Lengthwise stretching | Stretching ratio (times) | 1.17 | 1.17 | 1.17 | 1.17 | 1.16 | 1.16 |
| | Stretching temperature (° C.) | 120 | 120 | 120 | 120 | 125 | 124 |
| | Stretching time (min) | 1 | 1 | 1 | 1 | 1 | 1 |
| | Film width (mm) | 1300 | 1300 | 1300 | 1300 | 1300 | 1300 |
| Fixing | Fixing width (times) | 0.995 | 0.995 | 0.995 | 0.995 | 0.995 | 0.995 |
| | Treating temperature (° C.) | 122 | 122 | 122 | 122 | 122 | 122 |
| | Treating time (min) | 1 | 1 | 1 | 1 | 1 | 1 |
| | Film width (mm) | 1200 | 1200 | 1200 | 1200 | 1200 | 1200 |
| Thickness of each layer | Resin layer A1 (μm) | 7 | 9 | 7 | 6 | 8 | 8 |
| | Resin layer B (μm) | 55 | 55 | 55 | 55 | 66 | 75 |
| | Resin layer A2 (μm) | 1 | 1 | 2 | 1 | 1 | 1 |
| Resin layer A1 | Re (nm) | 0 | 0 | 0 | 0 | 0 | 0 |
| | Rth (nm) | 132 | 152 | 132 | 112 | 132 | 132 |
| Resin layer B | Re (nm) | 130 | 130 | 130 | 130 | 110 | 130 |
| | Rth (nm) | −128 | −128 | −128 | −128 | −128 | −148 |
| Resin layer A2 | Re (nm) | 0 | 0 | 0 | 0 | 0 | 0 |
| | Rth (nm) | 24 | 24 | 44 | 24 | 24 | 24 |
| Slow axis direction | Resin layer A1 (°) | — | — | — | — | — | — |
| | Resin layer B (°) | 0 | 0 | 0 | 0 | 0 | 0 |
| | Resin layer A2 (°) | — | — | — | — | — | — |
| Layered phase difference film | Re (nm) | 130 | 130 | 130 | 130 | 110 | 130 |
| | Rth (nm) | 28 | 48 | 48 | 8 | 28 | 28 |
| | Nz coefficient | 0.72 | 0.87 | 0.87 | 0.56 | 0.75 | 0.56 |
| | Front brightness | 1.0 | 1.0 | 1.0 | 1.0 | 1.0 | 1.0 |
| | Light leakage | 1.0 | 2.2 | 1.7 | 2.1 | 1.7 | 2.3 |

TABLE 2

Results of Comparative Examples 1-2

| | | Comp. Ex. 1 | Comp. Ex. 2 |
|---|---|---|---|
| Size of resin layered body | Layer a1 thickness (μm) | 17 | 12 |
| | Layer b thickness (μm) | 184 | 162 |
| | Layer a2 thickness (μm) | 9 | 12 |
| | Film width (mm) | 750 | 600 |
| Crosswise stretching | Stretching ratio (times) | 2.8 | 3.5 |
| | Stretching temperature (° C.) | 155 | 152 |
| | Stretching time (min) | 1 | 1 |
| | Film width (mm) | 1600 | 1600 |
| Lengthwise stretching | Stretching ratio (times) | 1.20 | 1.25 |
| | Stretching temperature (° C.) | 128 | 128 |
| | Stretching time (min) | 1 | 1 |
| | Film width (mm) | 1300 | 1300 |
| Fixing | Fixing width (times) | 0.995 | 0.995 |
| | Treating temperature (° C.) | 122 | 122 |
| | Treating time (min) | 1 | 1 |
| | Film width (mm) | 1200 | 1200 |
| Thickness of each layer | Resin layer A1 (μm) | 6 | 3 |
| | Resin layer B (μm) | 30 | 41 |
| | Resin layer A2 (μm) | 3 | 3 |
| Resin layer A1 | Re (nm) | 48 | 25 |
| | Rth (nm) | 151 | 65 |
| Resin layer B | Re (nm) | 91 | 80 |
| | Rth (nm) | −174 | −102 |
| Resin layer A2 | Re (nm) | 24 | 25 |
| | Rth (nm) | 76 | 65 |

TABLE 2-continued

Results of Comparative Examples 1-2

|  |  | Comp. Ex. 1 | Comp. Ex. 2 |
|---|---|---|---|
| Slow axis direction | Resin layer A1(°) | 2 | 2 |
|  | Resin layer B(°) | 0 | 0 |
|  | Resin layer A2(°) | 2 | 2 |
| Layered phase difference film | Re(nm) | 163 | 130 |
|  | Rth(nm) | 53 | 28 |
|  | Nz coefficient | 0.83 | 0.72 |
| Front brightness |  | 2.3 | 1.7 |
| Light leakage |  | 2.1 | 11.2 |

[Discussion]

As can be seen from Table 1, both the front brightness and light leakage when black color is displayed can be reduced in Examples 1 to 6. In Examples 2 and 6, the value of the light leakage is larger than that in Comparative Example 1. However, in Examples 2 and 6, the front brightness when black color is displayed is significantly smaller than that in Comparative Example 1. Therefore, when both the front brightness and light leakage when black color is displayed are evaluated comprehensively, the results obtained in Examples 2 and 6 are better than the results obtained in Comparative Example 1.

It was confirmed that, according to the present invention, the shift in the relationship between the in-plane slow axes of the layers contained in the layered phase difference film can be prevented and the front brightness and light leakage when black color is displayed on the liquid crystal display device can be reduced.

REFERENCE SIGNS LIST

10 Incident-side polarizing plate
10A Absorption axis of incident-side polarizing plate
20 Liquid crystal cell
30 Emission-side polarizing plate
100 Layered phase difference film
110 Resin layer A2
120A In-plane slow axis of resin layer B
120 Resin layer B
130 Resin layer A1

The invention claimed is:

1. A layered phase difference film comprising, in the following order: a resin layer A1 formed of a resin A1 having a positive intrinsic birefringence; a resin layer B formed of a resin B having a negative intrinsic birefringence; and a resin layer A2 formed of a resin A2 having a positive intrinsic birefringence, wherein
the resin layer A1 and the resin layer B are in direct contact with each other,
the resin layer B and the resin layer A2 are in direct contact with each other,
the resin layer A1 and the resin layer A2 are negative C-plates, the resin layer B is a positive B-plate, and
the layered phase difference film has an Nz coefficient within a range of 0 to 1.

2. The layered phase difference film according to claim 1, wherein
an in-plane retardation $Re_{A1}$ of the resin layer A1, a retardation $Rth_{A1}$ of the resin layer A1 in a thickness direction, an in-plane retardation $Re_B$ of the resin layer B, a retardation $Rth_B$ of the resin layer B in the thickness direction, an in-plane retardation $Re_{A2}$ of the resin layer A2, and a retardation $Rth_{A2}$ of the resin layer A2 in the thickness direction satisfy
0 nm $\leq Re_{A1} \leq$ 5 nm,
100 nm $\leq Rth_{A1} \leq$ 160 nm,
110 nm $Re_B$ 150 nm,
−160 nm $\leq Rth_B \leq$ −100 nm,
0 nm $\leq Re_{A2} \leq$ 5 nm, and
10 nm $\leq Rth_{A2}$ 40 nm,
the in-plane retardation $Re_{A1}$, the retardation $Rth_{A1}$, the in-plane retardation $Re_B$, the retardation $Rth_B$, the in-plane retardation $Re_{A2}$, and the retardation $Rth_{A2}$ being measured at a wavelength of 550 nm.

3. The layered phase difference film according to claim 1, wherein an absolute difference between a glass transition temperature $Tg_{A1}$ of the resin A1 and a glass transition temperature $Tg_B$ of the resin B is higher than 5° C. and 40° C. or lower.

4. The layered phase difference film according to claim 1, having an in-plane retardation Re of 50 nm or more and 400 nm or less.

5. The layered phase difference film according to claim 1, having a retardation Rth in the thickness direction of −50 nm or more and 50 nm or less.

6. A method for producing a layered phase difference film according to claim 1, the method comprising:
a first stretching step of stretching a resin layered body including, in the following order, a layer a1 formed of the resin A1, a layer b formed of the resin B and in direct contact with the layer a1, and a layer a2 formed of the resin A2 and in direct contact with the layer b at a temperature T1 and a stretching ratio of 1.1 times or more and 2 times or less in a first direction; and
a second stretching step of stretching the resin layered body that has been stretched in the first stretching step at a temperature T2 that is lower than the temperature T1 in a second direction that is orthogonal to the first direction to thereby obtain the layered phase difference film.

7. The method for producing a layered phase difference film according to claim 6, wherein the resin layer B of the layered phase difference film has an in-plane slow axis parallel to the first direction.

8. The method for producing a layered phase difference film according to claim 6, wherein (a total thickness of the layer a1 +a total thickness of the layer a2)/(a total thickness of the layer b) is 1/15 or more and 1/4 or less.

9. The method for producing a layered phase difference film according to claim 6, wherein the resin layered body is produced by a co-extrusion method using the resin A1, the resin B, and the resin A2.

10. The method for producing a layered phase difference film according to claim 6, wherein
the glass transition temperature $Tg_{A1}$ of the resin A1 and the glass transition temperature $Tg_{A2}$ of the resin A2 are higher than the glass transition temperature $Tg_B$ of the resin B, and
the temperature T1 is higher than $Tg_B$ and is lower than a higher one of $Tg_{A1}$ and $Tg_{A2}$ +20° C.

11. The method for producing a layered phase difference film according to claim 6, wherein
the glass transition temperature $Tg_{A1}$ of the resin A1 and the glass transition temperature $Tg_{A2}$ of the resin A2 are higher than the glass transition temperature $Tg_B$ of the resin B, and
the temperature T2 is higher than $Tg_B$ −20° C. and lower than $Tg_B$ +5° C.

* * * * *